United States Patent [19]
Doege et al.

[11] Patent Number: 6,021,683
[45] Date of Patent: Feb. 8, 2000

[54] DRIVE APPARATUS FOR A FORMING MACHINE

[75] Inventors: Eckart Doege, Hemmingen; Martin Hindersmann, Hannover; Ulrich Keller, Burgdorf, all of Germany

[73] Assignee: Verein Deutscher Werkzeugmaschinenfabriken e.V. (VDW), Frankfurt am Main, Germany

[21] Appl. No.: 08/782,300

[22] Filed: Jan. 15, 1997

[30] Foreign Application Priority Data

Jan. 16, 1996 [DE] Germany .................. 196 01 300

[51] Int. Cl.$^7$ ................ F16H 21/22; F15H 55/17; B30B 1/06

[52] U.S. Cl. .............. 74/44; 74/437; 100/282; 100/292

[58] Field of Search .................. 74/44, 434, 439, 74/437, 438, 45, 25; 100/282, 292

[56] References Cited

FOREIGN PATENT DOCUMENTS

| | | |
|---|---|---|
| 15 02 326 | 10/1975 | Germany . |
| 29 27 503B2 | 3/1981 | Germany . |
| 41 03 946A1 | 8/1992 | Germany . |
| 43 37 413C1 | 3/1995 | Germany . |
| 61-092800 | 10/1986 | Japan . |
| 62-1214742 | 5/1987 | Japan . |
| 0 254 958 | 2/1988 | Japan . |
| 1143797 | 6/1989 | Japan . |

*Primary Examiner*—Tamara L. Graysay
*Assistant Examiner*—Marcus Charles
*Attorney, Agent, or Firm*—Shlesinger Arkwright & Garvey, LLP

[57] ABSTRACT

The invention concerns a drive unit for a forming machine, comprising a rotary drive and a knuckle-joint drive for a gear transmission operating a ram, the knuckle-joint drive being operationally connected through a gear transmission to the rotary drive. To improve the drive rigidity as regards a forming machine and to be able to improve the drive-unit design and to relatively easily match the drive unit to the specific requirements of different forming methods, the gear transmission offers a periodically varying transmission ratio, at least two mutually engaging non-circular gears being used of which the pitch curves are designed in such manner that in conjunction with the knuckle-joint drive, and especially in conjunction with a subsequent crank drive, the motions of the ram will be optimally matched thereby to the particular work method.

15 Claims, 10 Drawing Sheets

DRIVE APPARATUS FOR A FORMING MACHINE

FIELD OF THE INVENTION

The invention concerns a drive unit for a forming machine, for instance a press.

BACKGROUND OF THE INVENTION

Various methods are employed for different workpieces made of different materials when processing workpieces on presses. The plethora of processing methods is met with presses based on various operational principles in order to meet the particular technical requirements.

Illustratively, when deep-drawing large auto body parts using correspondingly massive tools it is desirable that the tool shall impact at minimal speed the material to be formed when the deep-drawing process begins. A so-called impact otherwise taking place between the blankholder and the drawing bottom die degrades optimal spreading of lubricant and accordingly hurts the procedure. Furthermore this impact generates considerable and undesired noise. A substantial impact will strongly load the press, the tools and the drawing system.

A hydro-mechanical hybrid drive unit is known and described in WISSENSCHAFTLICHE ZEITSCHRIFT DER TECHNISCHEN UNIVERSITÄT DRESDEN, 40, 1991, vol. 3/4, where the drive unit integrates the hydraulic cylinder into the force path of a crankpress and the approximately (co)sinusoidal motion of the press plunger is complemented by an additional motion from the hydraulic cylinder. The motion of the additional hydraulic cylinder in the force path is controllable within wide limits and illustratively it is possible during deep-drawing auto body parts to gently deposit the blankholder on the drawing die at the beginning of deep-drawing.

One drawback of this known press is that substantially the complete hydraulics and control system of a hydraulic press is required in addition to the mechanical portion of the press in the force path of the press drive unit. As a result, the known press is expensive in design and manufacture.

Moreover press knuckle-joint drives are known for instance from the periodical WERKSTATT UND BETRIEB, 124, 1991, vol. 5. Such drive systems have been developed for instance to achieve a minimal and approximately constant operational speed in the vicinity of the lower reversal point of the press, as desired for instance for stamping. However the mechanical design of the knuckle-joint drive unit allows only slight latitude when kinematically designing the press drive unit.

Another drawback of the known knuckle-joint drive units is that they preclude rapid return strokes, and as a result the operational rate and hence productivity of the press are undesirably lowered.

Moreover articulating drives are known for presses, comprising a plurality of mutually articulating levers with which a uniform rotation of a drive shaft is transmitted non-uniformly to the press ram. Illustratively complex articulating drives are known from the German Auslegeschriften 1,502,326 and 2,927,503, namely in the form of a single-crank drive of a dually acting press used for deep-drawing, wherein the sheetmetal-holding ram rests in the work zone at uniform crankshaft rotation while the draw ram descends at approximately constant work speeds In the vicinity of the upper dead point the speed of both rams is much slowed, and adequate time is available to change the workpiece. The return-stroke zones remaining between the two above described regions are crossed at higher speed in order to achieve a short operational rate for one period of motion.

The known articulating or knuckle-joint drives incur the drawback that they are made up of many components and hence are complex and their manufacture is costly. Furthermore, mass production is hampered because of the number of different knuckle-joint drives. The particular design of the knuckle-joint drive directly affects the design of the remaining press.

In spite of the many known articulating or knuckle-joint drives, it is desirable in many applications to further improve the matching between the ram motion and the particulars of any one processing method. Illustratively this consideration applies to hot forging. In such an instance it is desired to achieve the highest possible ram speed at the lower dead point in order to minimize tool wear caused by tool heating in hot forging. This attempt fails with the known knuckle-joint drives because of their low rigidity. A basic drawback of the known knuckle-joint drives is that the rigidity of the knuckle-joint drive is lowered because of the large number of links within the kinematic chain of said knuckle-joint drive. As a result, a portion of the energy input made available from the knuckle-joint drive goes into press resiliency and hence is unavailable for processing the workpiece—a phenomenon which is always undesired.

A variation of the above designs is present in geared n-bar linkages involving a combination of multi-link knuckle-joint drives with at least two gears. They differ from a knuckle-joint drive preceded by a stationary gear drive in that the gears are affixed to or rest on the articulating cranks and revolve with them. Illustratively the periodical DER KONSTRUKTEUR 24, 1993, vol. 11, pp 39–40 describes such a drive unit for a draw ram of a deep-draw press.

The motion of a corresponding ram or of the ram of a cold-forming press can be generated by a geared n-bar linkage such as described in the periodical KONSTRUKTION 45, 1993, vol. 4, pp 117–120.

The known geared n-bar linkages evince the same drawbacks as the known knuckle-joint drives.

Machine components such as gears with oval or elliptical pitch curves are known. Such gears, just as eccentrically supported circular gears, are part of the non-circular gears. Non-circular gears as a rule are those with non-uniform pitch-curved gearings defined by predetermined centrodes (gear pitch curves) with pivoting or revolving output, which, on account of the toothing of the gear pitch curves, mesh together (see B SIEMON, Das exzentrisch gelagerte Zahnradpaar, dissertation, Hannover U. 1981).

The European patent document 0,254,958 A1 discloses such an intermittent drive unit employing a pair of centrally supported oval gears.

The German patent document 4,103,946 A1 describes a multi-stage drive unit with several elliptical gears that are mutually adjustable in order to vary the transmission ratio of the overall drive unit. Possible applications are blood pump drives, auxiliary drive units for internal combustion engines and for instance bicycle pedaling cranks.

Moreover a gear unit is known from the German patent document 4,337,413 C1 which comprises non-circular gears and flywheels and which besides driving a processing machine also is used especially for storing kinetic energy. The gear unit evinces an average transmission of unity and is in two stages, and besides delivering an output also acts on an additional storing shaft with a separate flywheel. The components of the transmission are so matched to one another that the kinetic energy of the overall system always is constant. If there is a change in the motion, back-impacting by the tooth sides will be prevented.

The above drive units and gearing units with non-circular gears represent special solutions foremost for the transmission of torques which are small in relation to press operations, and therefore are unsuited for pressing. Moreover such units cannot offer the transmission stages required for presses or the constrained desired ram motions.

The Japanese patent 62-114742 discloses a drive unit for a ram of a forming machine using a special non-circular pair of gears. Each of the non-circular gears is rotatably supported at its geometric center. On account of the axial symmetry of the pitch curves of the described non-circular pair of gears, the ram motion repeats identically in its forward and return motions. As a result the ram motion cannot be optimized over the total ram displacement, that is, not with respect to forming and productivity. The drawback manifests itself in that forming can only be improved in some procedures by means of the lower ram speed while other procedures requiring higher rates of forming are ignored. In addition the production rate can be increased only for a ram forming speed equal to that of conventional crank drives.

OBJECTS AND SUMMARY OF THE INVENTION

The object of the present invention is to create a pertinent drive unit for a forming machine, where said drive unit evinces improved rigidity, simplified design and is made more uniform, and where said unit foremost is easily matched to specific requirements of various forming procedures and of productivity.

This problem is solved by the drive unit for a forming machine according to the present invention comprising a rotary drive and a knuckle-joint drive for a ram, the knuckle-joint drive being operationally connected by a gear transmission to a rotary drive and a gear transmission containing at least two mutually meshing non-circular gears whereby the pitch curves and/or the centers of rotation of the non-circular gears are arbitrarily selectable for the purpose of optimizing the entire ram motion in order to achieve optimal forming and simultaneously optimal; that is, maximum productivity.

Advantageous and appropriate further developments are stated in the following specification and claims.

The present invention creates a transmission having a periodically varying transmission ratio, and in particular comprising non-circular gears in the speed-changing stage of a forming machine, for instance a press combined with an articulating, i.e. a knuckle-joint drive. The transmission ratio is defined as the ratio of the drive angular speed to output angular speed. As a result, the ram kinematics may be varied within wide limits and hence the desired optimal motion may be matched to the particular operational procedure. As a rule, a simple slider crank mechanism suffices for this purpose. The particular ram motion to be implemented is achieved by means of a suitable geometry of the gear pitch curves. These gear pitch curves are computed from the desired procedure-dependent ram kinematics. The shape of the gear pitch curves is nearly arbitrarily selectable within wide limits, it is not bound to regular geometric shapes. Thereby they differ substantively from the known non-circular gears. Another significant difference is in the magnitude of the forces and torques being transmitted. The smallest average gear diameters of non-circular gears for forming-machine drives are at least as large as the largest average diameters of the known applications. The slider-crank mechanism preferably used in the forming machines on account of its simple design is characterized by high longitudinal rigidity in its operational range shortly before and especially at the lower dead point because its components then will be stretched out. Accordingly they are pressure-loaded but not bending-loaded.

Foremost the advantages offered by the invention are that a simple solution can be used for the most diverse ram motions as a function of the most diverse processing procedures. Advantageously in designing and manufacturing such forming machines, for instance presses, instead of the earlier knuckle-joint presses or other presses fitted with drive units composed of many components, presses can now be designed with a widely used crank drive which is of simple design and hence of economical manufacture. In this manner the number of crank presses identical in design principles and produced in small runs can be increased. At the same time by resorting to standard designs, press production time is reduced. The design of these crank presses employing the most diverse non-circular gears in the speed-changing stage thus allows the most diverse motions of the press ram with the same basic press design. It is even possible to achieve completely new motion characteristics of the press ram by rapidly exchanging the gears of the speed-changing stage.

By mounting several parallel pairs of non-circular gears in the form of a control mechanism, switching over in the least possible time from one processing procedure to another is allowed. Given an average transmission ratio different from unity, the functions of the non-circular gears, the conversion of periodic angular speed and of torque, and the functions of a conventional speed-changing stage with circular gears, the uniform conversion of angular speed and of torque, may be combined within the same components. This feature represents an additional and considerable savings made possible by the drive unit of the invention. The invention is elucidated below in relation to the attached drawings showing illustrative embodiments.

DETAILED DESCRIPTION OF THE INVENTION

The same components in each of the figures of the drawings are denoted by the same reference numerals.

Figure 1:
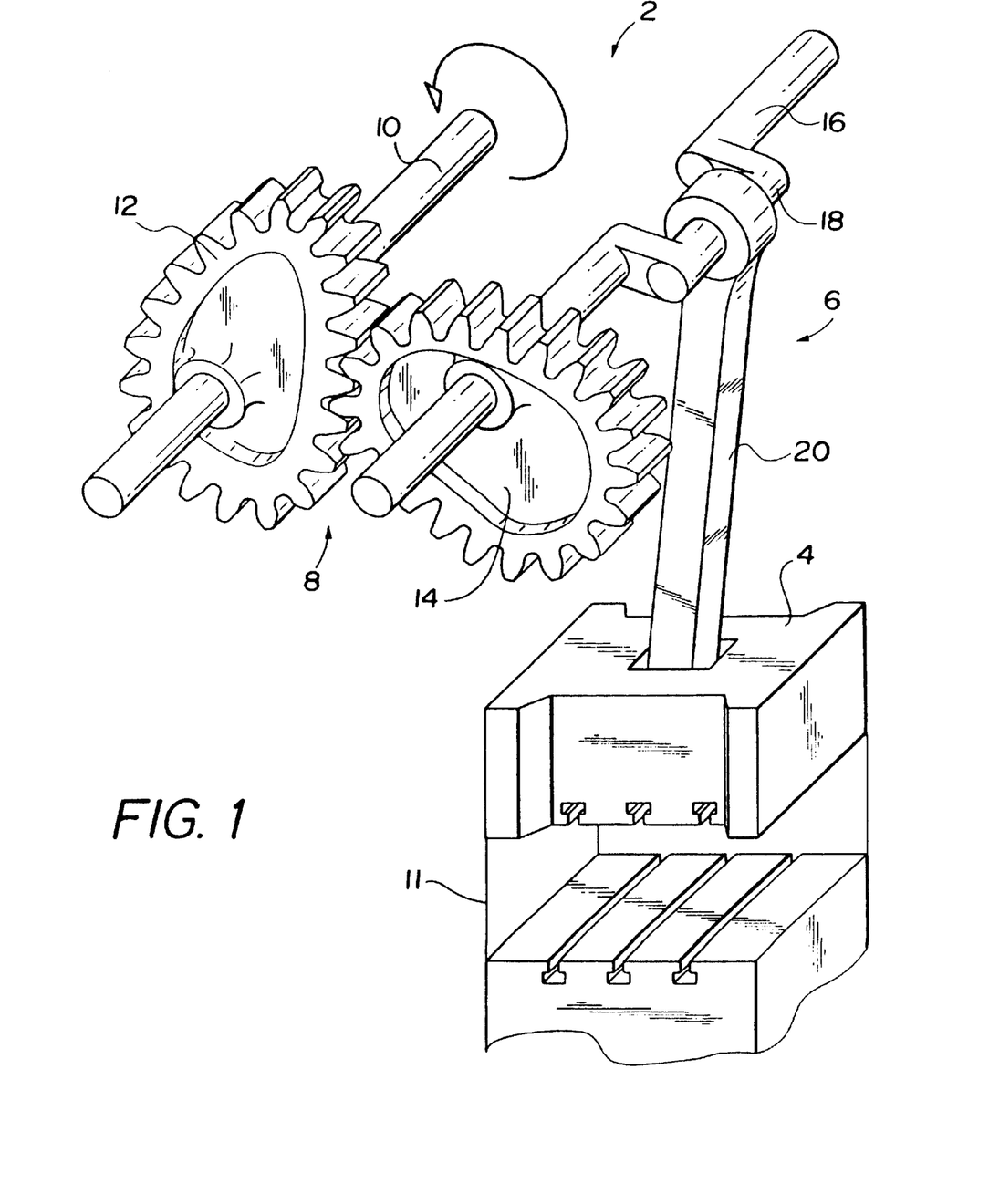
FIG. 1 is a first embodiment of the drive unit of the invention shown in schematic perspective.

FIG. 1 shows a drive unit 2 wherein a ram 4 of a forming machine, not shown in further detail in the drawing, for instance a press, is operationally connected by a crankdrive 6 and a gear unit 8, hereafter called transmission 8, to an output shaft 10. The reference number 11 denotes a framework with ram-guiding components. The transmission 8 in this embodiment comprises a first pair of non-circular gears 12 (drive gear) connected to the drive shaft 10 and meshing with a second pair of non-circular gears (output gear) 14. Non-circular gears in the sense of the invention are both gears with a non-circular pitch curve and eccentrically supported gears with a circular pitch curve. The output gear 14 is irrotationally joined to a crankshaft 16 of the crankdrive 6. The crankshaft 16 comprises an eccentric rod 18 connected in hinging manner to one end of the connecting rod 20 of which the lower end is connected in articulating manner to the ram 4. The average transmission ratio of the transmission 8 formed by the drive gear 12 and the output gear 14 is unity in this embodiment.

Figure 2A:
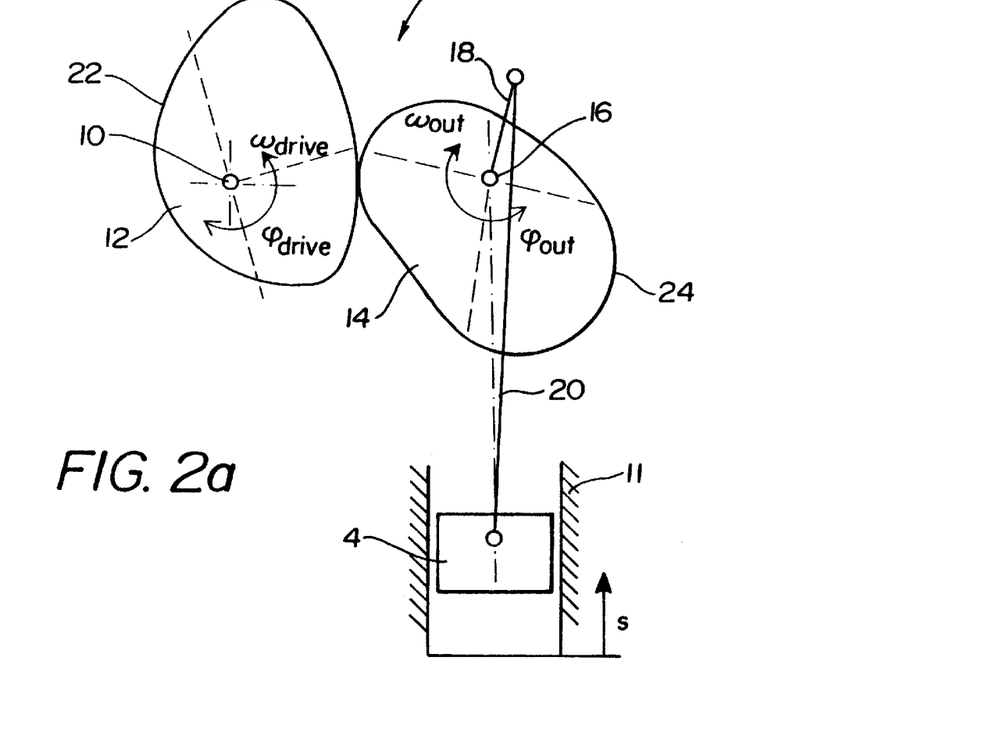
FIG. 2a is the embodiment of FIG. 1 in schematic sideview.
Figure 2B:
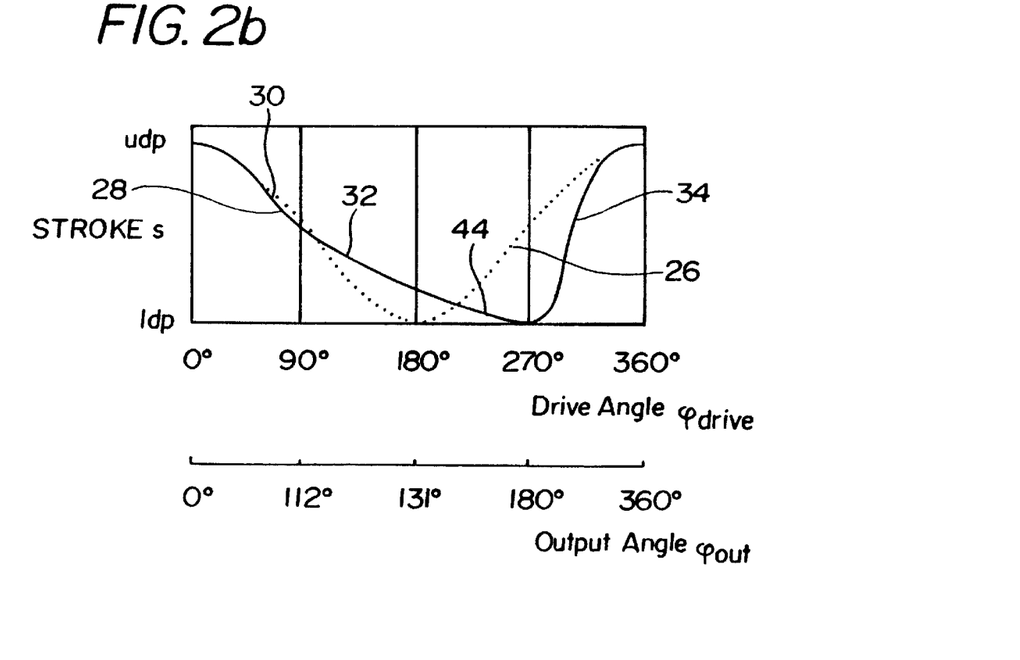
FIG. 2b shows the stroke of a forming-machine ram driven by the drive unit of FIG. 2a as a function of angle of rotation.

The operation of the drive unit 2 of FIG. 1 is elucidated in relation to FIGS. 2a and 2b.

The gears 12, 14 are schematically indicated in FIG. 2a by their pitch curves 22, 24, the toothings being omitted. The pitch curve 22 of the drive gear 12 and the pitch curve 24 of the output gear 14 are designed in this embodiment in a manner that the speed of the ram 4 during the work stroke of the forming machine shall remain constant for some significant time. Such a kinematics for the ram 4 is especially advantageous when forming such as deep-drawing and extrusion. In particular, when deep-drawing modern automotive bodies of low-weight construction, constant efforts are made to always improve the quality of complex parts. One of the factors affecting the drawing results is the speed function of the forming-machine ram 4. During operation of the forming machine, the drive shaft 10 carries out uniform rotation. When pairing two non-circular gears 12, 14 in the manner shown in FIG. 2a, the transmission ratio is selected such that the (co)sinusoidal ram-stroke 26 of the ram 4 shown in FIG. 2b shall be changed into the desired motion shown by the curve 28 (FIG. 2b). This result is achieved by enlarging the transmission ratio in the range of the angle of rotation $\phi_{out}$ of the non-circular output gear 14 between approximately 120 and 176° while simultaneously reducing the transmission ratio in the range of the angle of rotation $\phi_{out}$ of the non-circular output gear 14 between 176 and 360°. The work performed by the forming machine is thereby substantially improved.

The reference 44 denotes the work range of the ram motion.

Another requirement on forming workpieces is to gently set the upper tool affixed to the ram 4 onto the workpiece. If the setting speed is too high, the tool may be excessively loaded, possibly damaging the tool and the workpiece and hampering of the forming process may ensue. The pair of gears shown in FIG. 2b meets such constraints by the reduction of the transmission ratio of the non-circular gears 12, 14 in the range of rapid advance (reference 30 in FIG. 2b) and by enlarging the transmission ratio in the deposition zone of the upper tool on the workpiece (reference 32 in FIG. 2b), which in this instance is between approximately 118 and 125° of the angle of rotation $\phi_{out}$ of the non-circular output gear 14, as well as by reducing the transmission ratio of the non-circular gears 12 and 14 in the total range of the rapid return (reference 34 in FIG. 2b) of the ram 4.

Figure 3A:
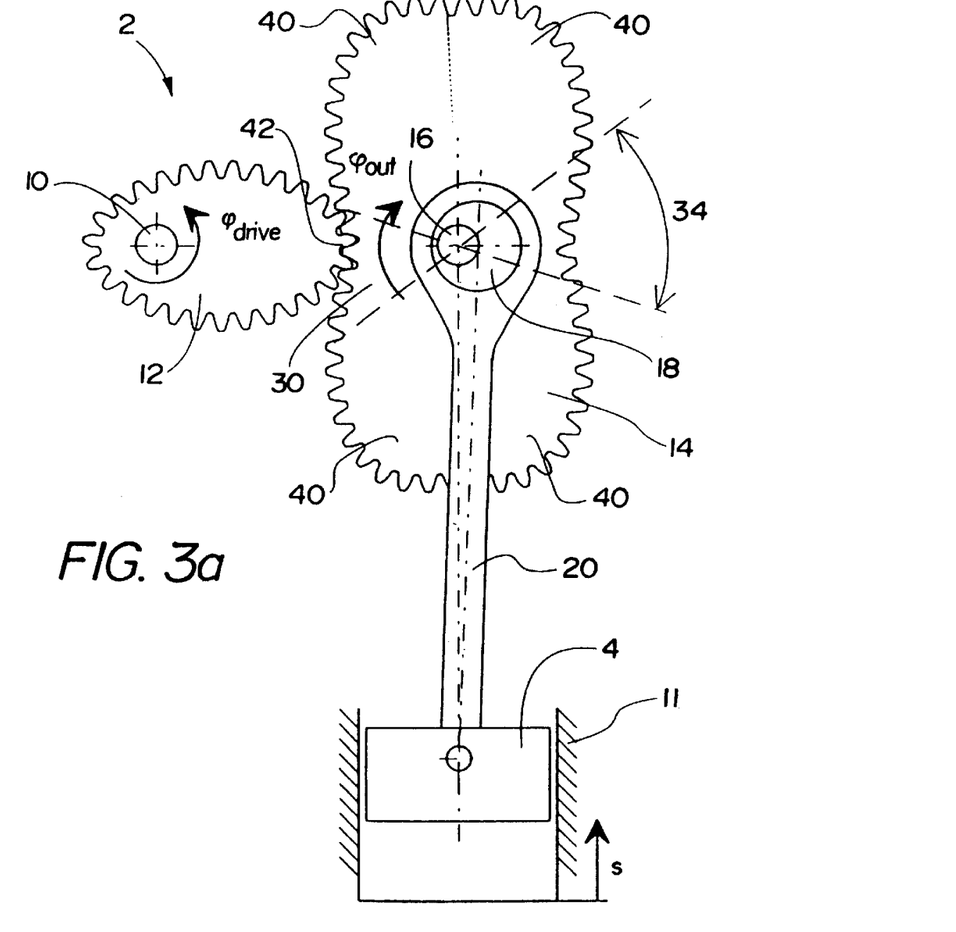
FIG. 3a is a schematic sideview of a second embodiment of the drive unit of the invention.
Figure 3B:
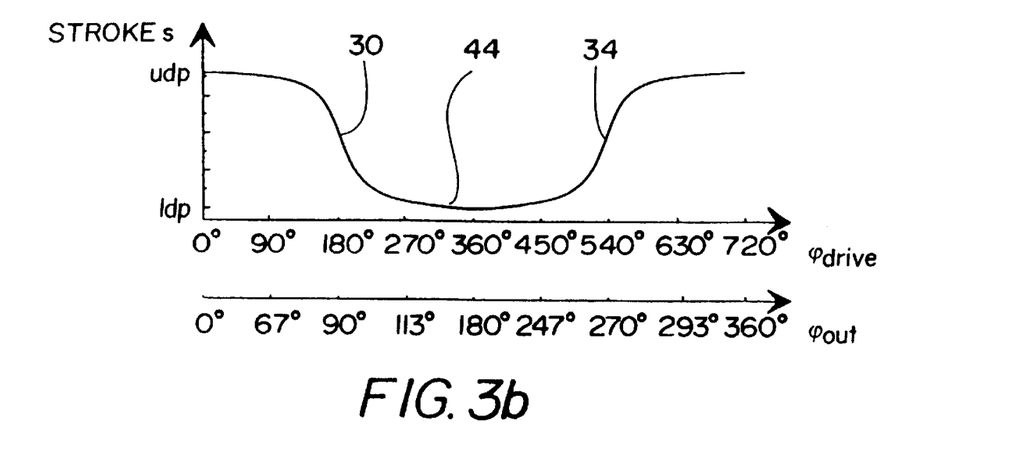
FIG. 3b shows the ram motion of a forming-machine ram driven by the drive unit of FIG. 3a as a function of angle of rotation.

FIG. 3 shows another embodiment of the drive unit 2 of the invention. This embodiment assumes a long dwell-time of the ram 4 during forming in the vicinity of the lower dead point (ldp) as shown by the curves of FIG. 3b. The forming-machine speed-changing stage composed of the non-circular drive gear 12 and the non-circular output gear 14 is designed in such manner that the ram is displaced at very low speed at its lower dead point. Moreover the speed-changing stage is simultaneously designed so that this range of low ram speed is maintained over an angle of rotation of the non-circular output gear 14 of more than 130°. A comparably low ram speed is desired in the zone around the upper dead point (udp) in order to secure the time required for exchanging workpieces. This zone as well extends over an angle of rotation of the output gear of more than 130° (see FIG. 3b). The desired kinematics for the displacement of the ram 4 is implemented by pairing an approximately elliptical drive gear 12 of which the center of rotation is eccentric but on the large axis of the ellipse, with an output gear 14 of which the pitch curve is composed of four segments of an approximate ellipse in a near-rectangular geometry. To achieve the long dwell-time of the ram 4 at its dead points, the drive gear 12 and the output gear 14 roll on one another at their zones of high transmission ratios (see reference 40 in FIG. 3a).

Such a ram stroke is required in particular in presses for sheetmetal deep-drawing and in stamping presses and heretofore has been implemented exclusively in mechanical presses using complex knuckle-joint drives. The implementation of the desired ram motion using a pair of non-circular gears 12, 14 achieves substantial simplification of the drive unit while simultaneously standardizing the components. The plurality of linkage parts is reduced to a known crankdrive 6 and a design-predetermined pair 12, 14 of non-circular gears. Where called for, small path changes in the vicinity of the lower reversal point of the ram 4 may be compensated by short-stroke cylinders between the connection rod the ram, such components anyway having been used so far in drawing presses for the fine-control of the blankholder force.

Again, the references 30 and 34 denote the regions of rapid advance and rapid return of the ram motion.

To minimize the required gear sizes, the pitch curves 22, 24 furthermore are designed so that, in the position of the output angle of rotation 90° before the lower dead point, high overlap shall be assured in the region 42 between the gears 12, 14, namely in that convex and concave regions of the gears 12 and 14 shall mesh. This feature makes it possible to substantially reduce the size of the drive unit generating the depressing force in the deep-draw procedure. In this particular advantageous region, the drive strand must fully apply the required torque, whereas the required torque on account of the kinematics of the crankdrive 6 approaches null in the position of one of the dead points. These gears offer a further characteristic in that the average transmission ratio is larger than unity, for instance being an integral 2. Thereby the non-circular pair of gears 12, 14 combines the conventional function of uniform conversion of angular speed and torque of circular transmission gears with the periodic, non-uniform conversion of angular speed and torque of the drive unit of the invention.

Figures 4A, 4B:
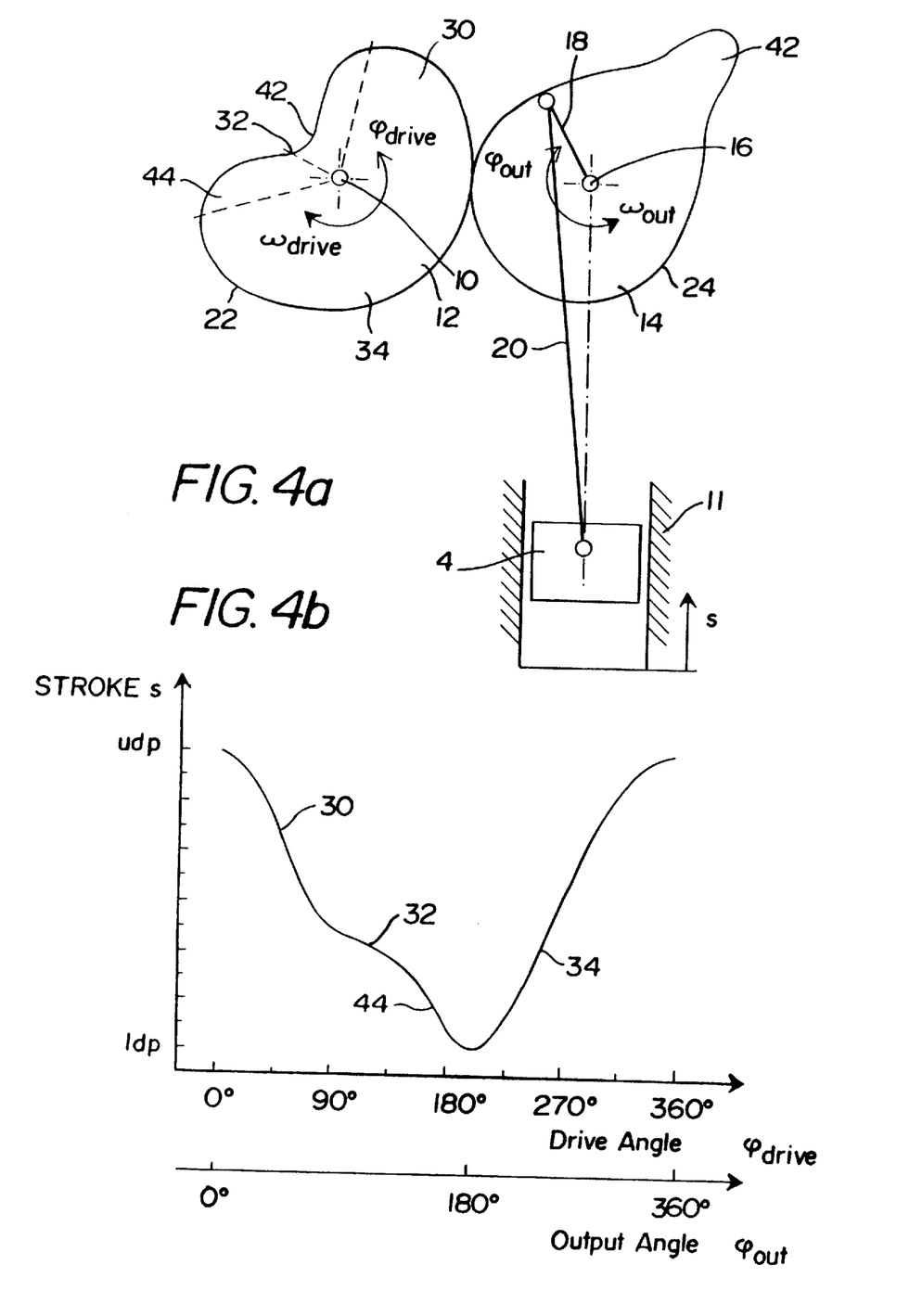
FIG. 4a is a schematic sideview of a third embodiment of the drive unit of the invention.
FIG. 4b shows the ram motion of a forming-machine ram driven by the drive unit of FIG. 4a as a function of angle of rotation.

FIG. 4a is a simplified view of a pair of gears 12, 14 which shall be used if process-technological improvements during forming are desired by setting the upper tool affixed to the ram 4 in exceedingly gentle manner on the workpiece with simultaneous high ram speed in the work range (work stroke). See for instance reference 44 in FIG. 4b. For example, when cutting certain materials the sheared surface quality will be improved by substantially increasing the cutting speed. In known drive units the increase in cutting speed is implemented by offsetting the cutting zone toward the upper dead point of the ram motion (high speed shearing). However such offsetting of the cutting zone entails an increase in the dipping depth of the cutting punch into the lower tool. Also, the operational rate is lowered by this conventional method and conflicts with high productivity. When combined with the uniform and low ram speed in the work range 44 described in relation to FIG. 2b, the extreme delay when depositing the ram 4 (reference 32 in FIG. 4b) on the workpiece will be appropriate for instance to minimize the impact.

By reducing the transmission ratio of the pitch curves 22, 24 in the work stroke 44 between 185 and 200° of the angle of rotation $\phi_{drive}$ of the non-circular drive gear 14, and with simultaneous enlargement of the transmission ratio in the range from 85 to 185° of the angle of rotation $\phi_{drive}$ of the non-circular drive gear 12 having the pitch curve 22, forming is possible in the embodiment of FIG. 4a by shearing sheetmetal at high speed and to simultaneously assure that the susceptible cutting elements be gently deposited at slow speed on the workpiece.

Figures 5A, 5B:
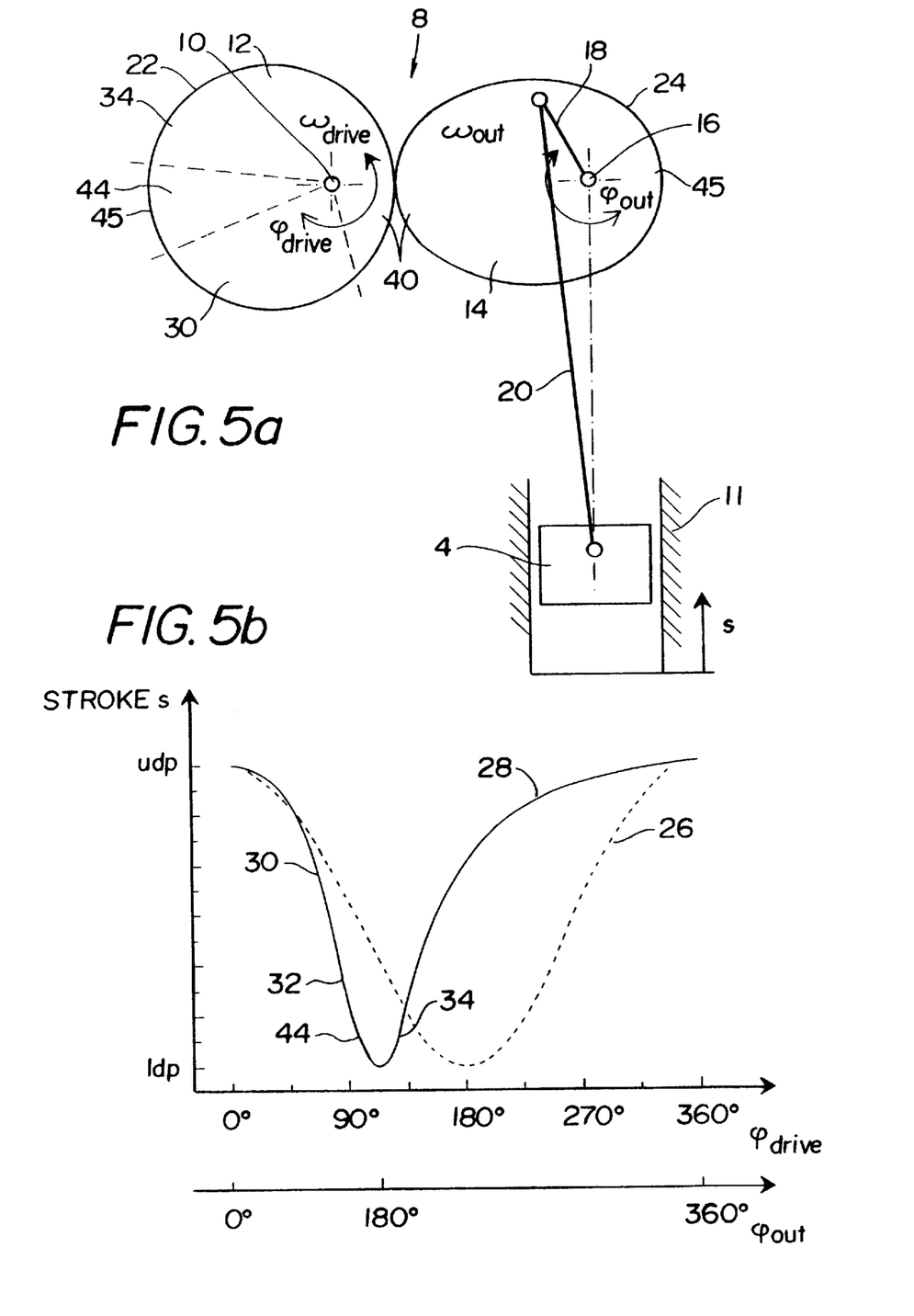
FIG. 5a is a schematic sideview of a fourth embodiment of the drive unit of the invention.
FIG. 5b shows the ram motion of a forming-machine ram driven by the drive unit of FIG. 5a as a function of angle of rotation.

FIG. 5a shows a drive unit of the invention for a forging press. To minimize tool wear and workpiece cooling, minimal pressure contact time is always desired, that is, the work range 44 should be transited as fast as possible. Again the forward and return motions 30 and 34 are designed to be such that they shall take place as fast as possible. This feature shortens the operational period. The time required for tool exchange is secured by slowly passing through the upper dead point. FIG. 5b shows the differences very clearly between the ram motion 28 achieved by means of the gears 12, 14 and evincing the (co)sinusoidal path 26 obtained when using conventional gears.

The described ram motion 28 is implemented in that, in the drive unit of the invention, the transmission ratio of the transmission 8 driving the crankshaft 16 is small in those regions 30, 34 and 44 which must be transited rapidly (see range 45 in FIG. 5a). As regards the ranges to be crossed slowly, the transmission ratio is commensurately large (range 40 in FIG. 5a). Such a transmission behavior is advantageously implemented by a pair of non-circular gears 12, 14 of which the drive gear 12 evinces a pitch circle and of which the center of rotation is located at a high eccentricity of 50% radius on the drive shaft 10. The circular and eccentrically supported drive gear 12, which by the above definition belongs to the non-circular gears, is more economically manufactured compared to gears with non-circular pitch curves. The output gear 14 is a non-elliptical, non-circular gear with a center of rotation on the crankshaft 16, said center of rotation also being located outside the geometric center. Starting from a position of the eccentric rod 18 at $\phi_{out}$=30° before the upper dead point corresponding to an approximate position of about $\phi_{drive}$=76.6°, the transmission ratio takes place in the low mode as far as approximately $\phi_{drive}$=130.2° of the drive angle of rotation as part of the slow ram motion in the vicinity of the upper dead point. In the ranges up to about 206.8° of the drive angle of rotation, the transmission ratio will be small to achieve the above behavior, and thereafter it will be large again.

Figure 6A:
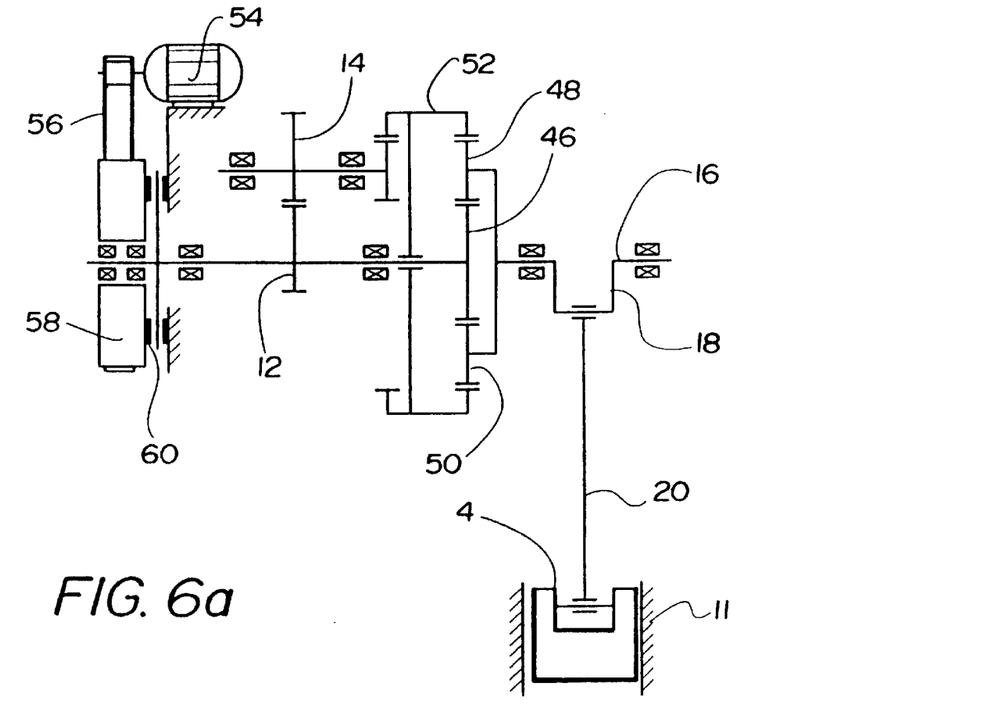
FIG. 6a is a schematic sideview of a fifth embodiment of the drive unit of the invention employing a planetary gear system.
Figure 6B:
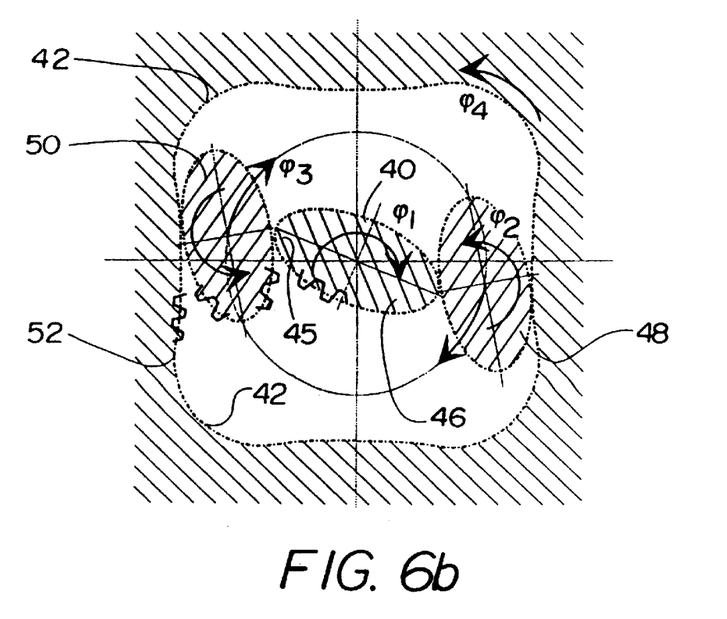
FIG. 6b is a sixth embodiment of the drive unit of the invention wherein the gear system of non-circular gears is a planetary gear system.

FIG. 6b shows an embodiment of a planetary gear transmission with non-circular gears. Known planetary gear transmissions with circular gears are characterized by compactness, high transmission ratios, high output powers, different but always uniform transmission ratio implementations depending on given transmission components or on drive component and output component when being used as superposition transmissions. These advantages are complemented in the planetary transmissions driving forming machines by the transmission ratios fluctuating about the average transmission ratio, the fluctuation transmission ratios being designed as they were in the previous embodiments to meet the requirements of forming. The sketched planetary transmission with non-circular gears to drive a forming machine in this embodiment is composed of a non-circular sun gear 46 of which the angle of rotation obeys a time-dependent angular function $\phi_1$, of two non-circular planet gears 48, 50 which rest rotatably on a carrier as in known planet gear trains while obeying a time-dependent angular function $\phi_2$ of rotation about their axis of rotation and which in addition and together with the carrier rotate according to a time-dependent angular function $\phi_3$, further of a non-circular internal gear 52 rotating according to the time-dependent angular function $\phi_4$. One or more of the angular functions $\phi_1$ through $\phi_4$ also may be identically zero, that is, the particular transmission component is fixed. The non-circular gears of this embodiment are designed in such a way that the contact-rolling of the gear pitch curves and hence the meshing of the toothings shall always be assured. In the transmission with non-circular gears shown in FIG. 6b, the contact-rolling is assured by the sun gear 46 (approximately in the shape of an ellipse), and also by planet gears 48, 50 of similar shapes and by the internal gear 52 of which the pitch curve approximately corresponds to a square with rounded corners. When the components are rotating, several positions are always obtained between some of the said components to provide high and low transmission ratios (see ranges 40 and 45 respectively). In the extreme positions of the planet gears 48, 50 relative to the internal gear 52 in particular, ranges 42 are transited which evince high toothing overlaps.

FIG. 6a is a schematic sideview of the combination of the transmission of non-circular gears of the invention with a planetary gearing set in a forming-machine drive unit. The Figure shows a drive unit wherein an electric motor 54, through a belt drive 56, drives a flywheel 58. In manner known for crank and eccentric presses, the flywheel 58 can be frictionally connected through a coupling 60 with a gearing shaft seating a non-circular drive gear 12. In this design, power tapping to the non-circular output gear 14 takes place. The shafts of the two non-circular gears 12, 14 act as inputs into the planetary gear set acting as a summing gear which as a rule and as illustrated in the drawing is fitted with round gears or, in special cases, additionally with non-circular gears and as discussed in relation to FIG. 6b. The planetary gear set acts on the crankshaft 16 of which the eccentric rod 18 drives, through the connecting rod 20, the ram 4. This ram 4 carries out the desired motion, generated by the cooperation of the non-circular gearing set and the planetary transmission, relative to the framework 11. In the shown embodiment variation, the non-circular drive gear 12 drives the sun gear 46 of the planetary transmission, the non-circular output gear 14 acting on the internal gear 52 of the planetary transmission. Such operation also may take place in a variation from the embodiment shown using an intermediate shaft to reverse the direction of rotation and illustratively also acting on an external toothing at the internal gear 52 if so desired. In the embodiment shown, the uniform angular speed of the sun gear 46 and the non-uniform angular speed of the internal gear 52 caused by the non-circular gears act through the planet gears 48 and 50 so that the carrier and thereby the crankshaft shall also be driven non-uniformly. It is clear therefore that the combinatorial freedoms of the planet transmission allow a plurality of designs with which every ram motion used in forming will be feasible.

This drive unit may evince a special feature by allowing a stoppage of the ram 4. For that purpose the sun gear 46 and the internal gear 52 must rotate in opposite directions. Circular planet gears require different angular speeds of the sun gear and internal gear 46 and 52 respectively of such magnitudes that the carrier shall be at rest. By rapidly changing the angular speed of the internal gear by changing the transmission ratio of the non-circular gears transmission, the carrier angular speed can rapidly be changed again to another angular speed different from zero, the direction of rotation being matched to the particular requirements. Therefore a temporary stoppage may also be achieved during the down-stroke of the ram 4 when being deposited on the workpiece.

Figure 7:
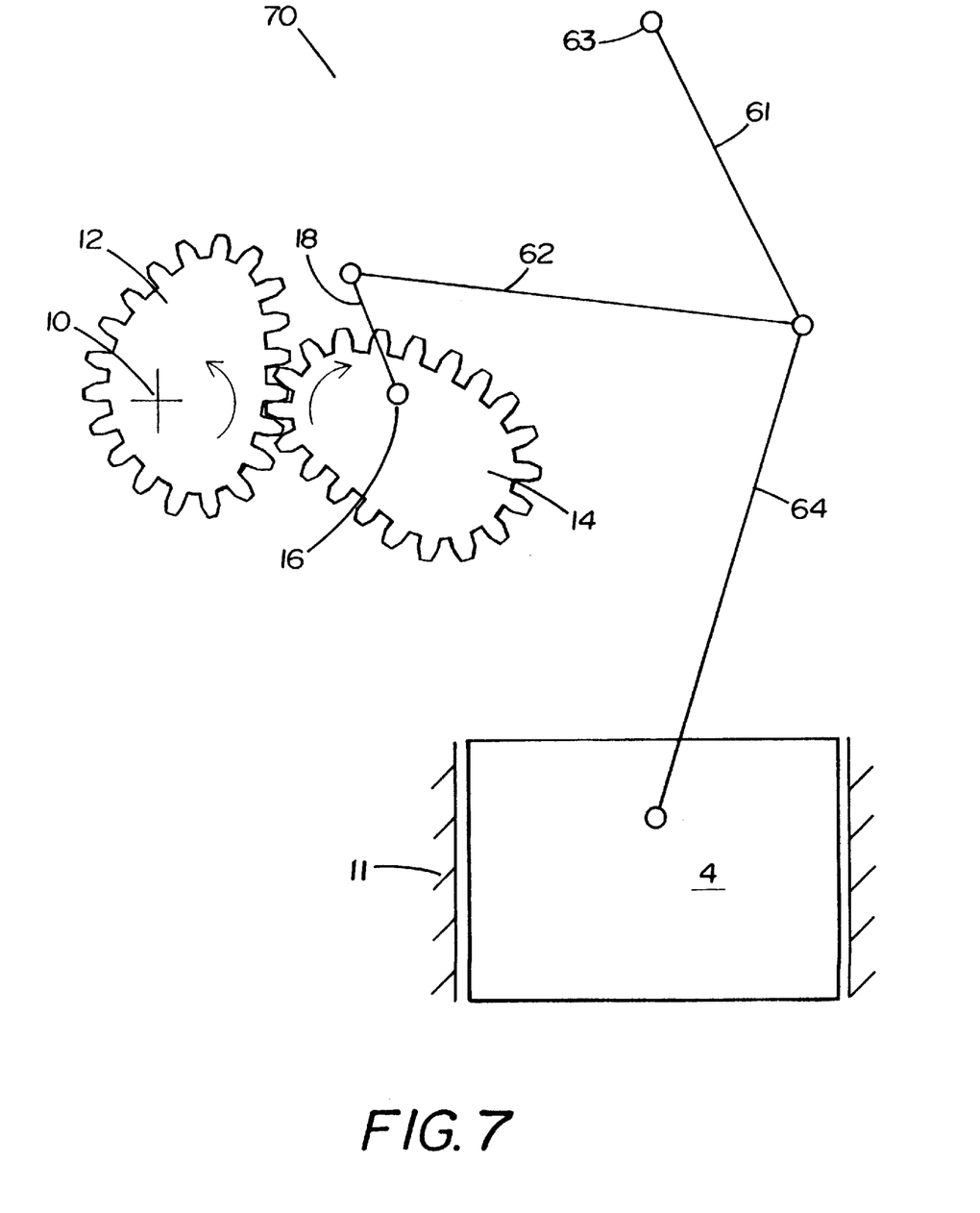
FIG. 7 shows the combination of a non-circular pair of gears with an articulating press, in particular a knuckle-joint press.
Figure 8A:
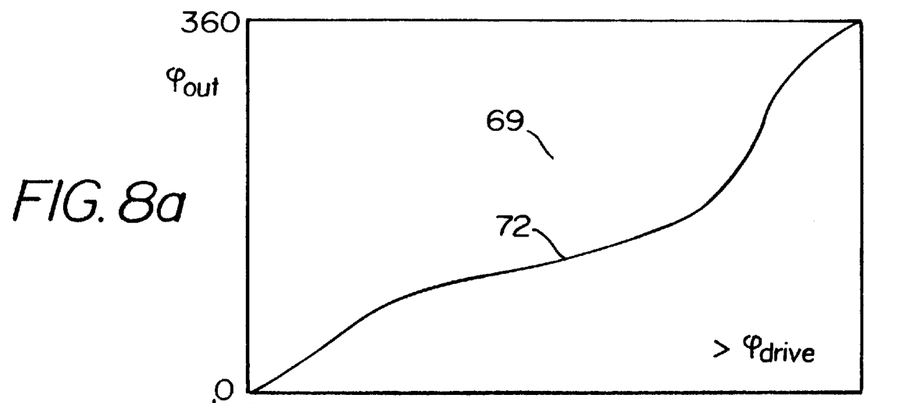
FIG. 8 shows the ram path at a very low work rate.
Figure 8B:
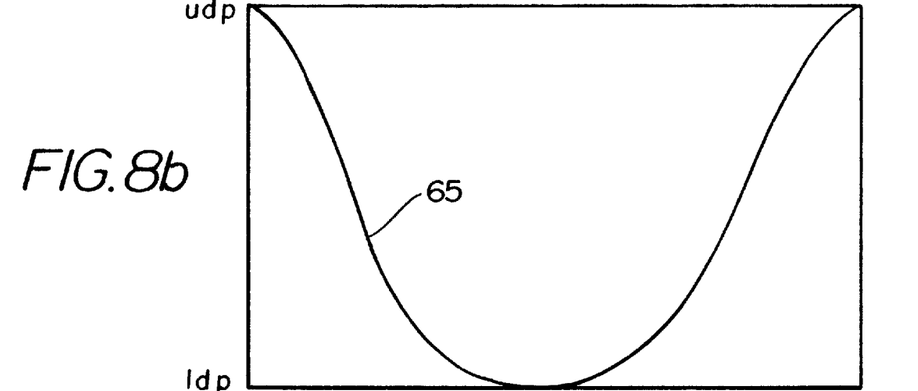
Figure 8C:
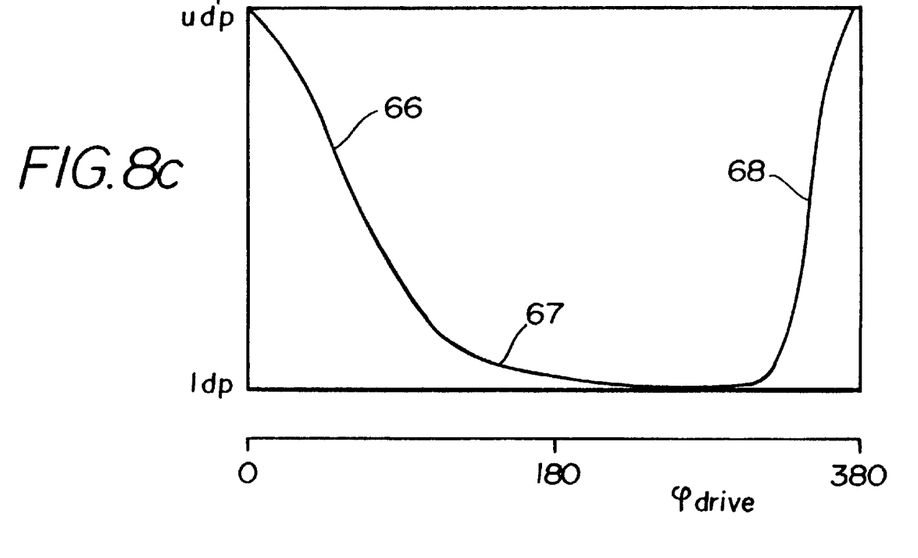
Figure 9A:
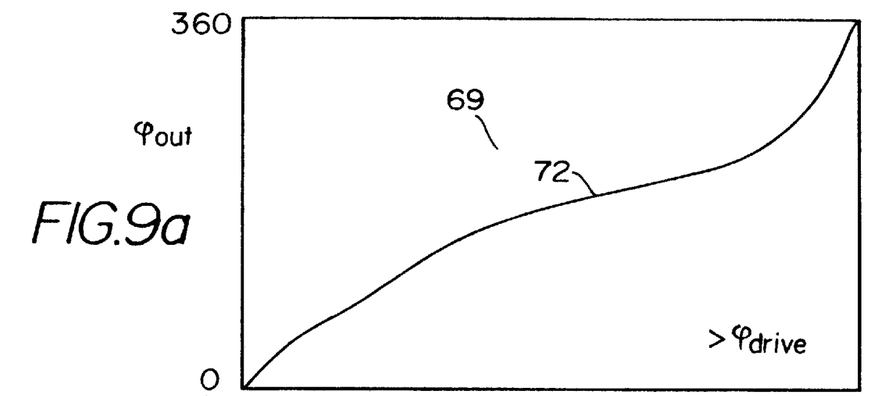
FIG. 9 shows the ram path with an exceedingly low reversal point.
Figure 9B:
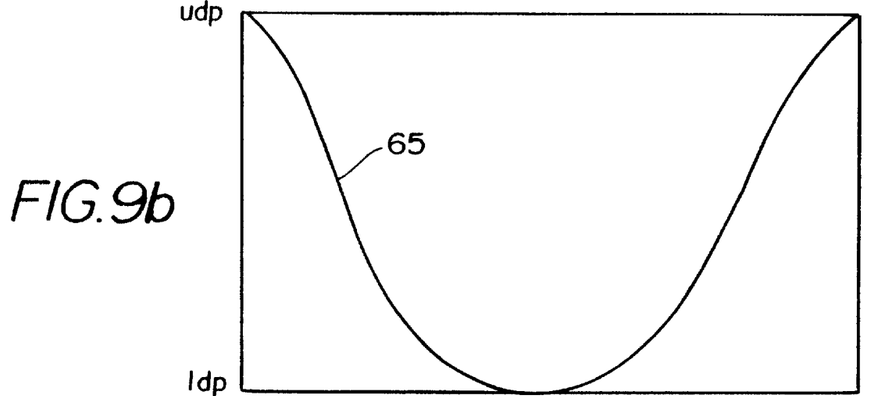
Figure 9C:
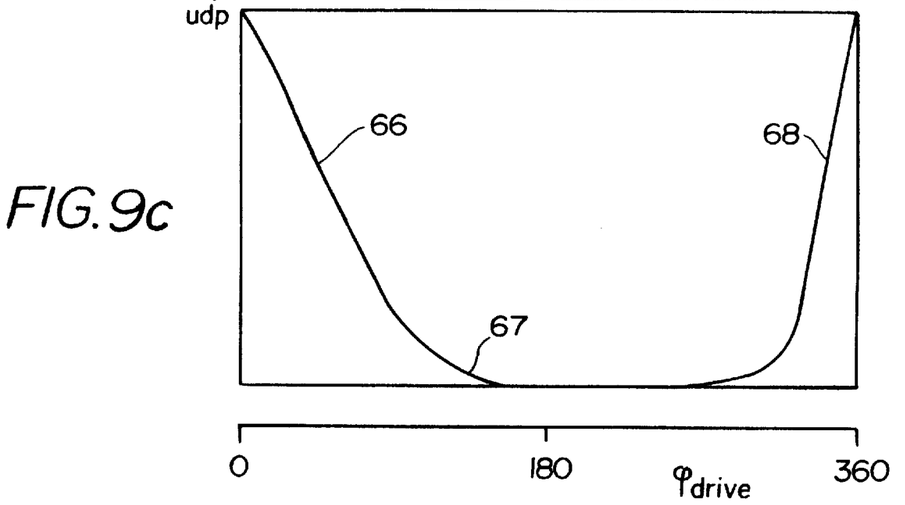
Figure 10A:
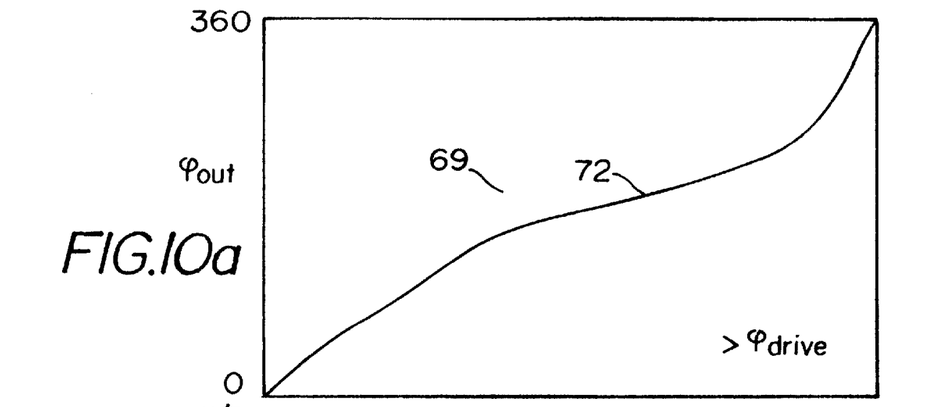
FIG. 10 shows the combination of a non-circular pair of gears and an articulating press with a short stop at the lower reversal point and the change in linkage kinematics caused by non-circular gears.
Figure 10B:
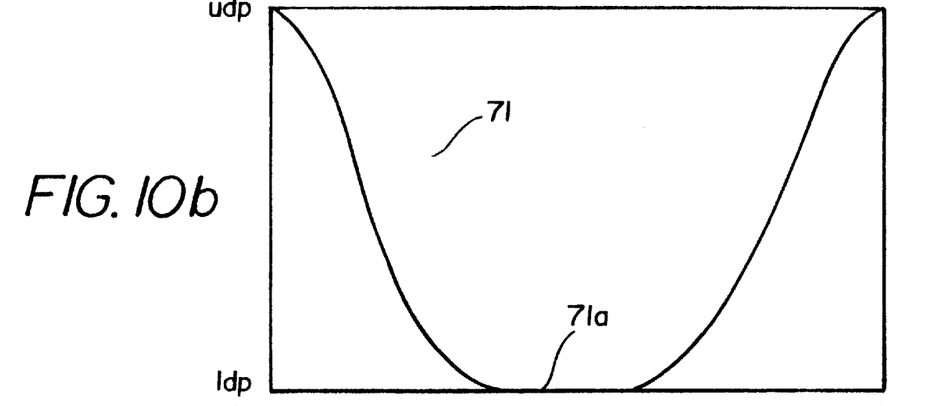
Figure 10C:
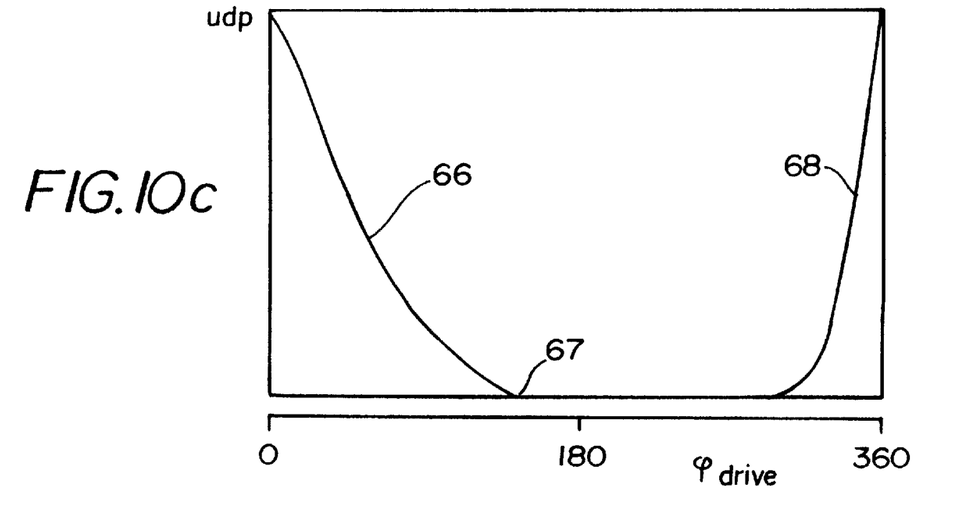

FIG. 7 shows the combination of a non-circular pair of gears 12, 14 with an articulating press, in particular a schematically discussed knuckle-joint press 70. By combining special knuckle-joint drives and non-circular gears, ram paths may be realized in this press which are hardly feasible in other manner or else would require exceedingly complex articulating or knuckle-joint drives with a large number of links. Furthermore as regards crank presses using non-circular gears, applicability will be restricted, for instance when used to drive blankholders in deep-draw presses. By combining a non-circular pair of gears with a still relatively simple articulating press, for instance a knuckle joint press 70, it now becomes feasible to replace complex knuckle-joint drives which are problematical regarding rigidity and integration with simple knuckle-joint drives. Illustrative examples are shown in FIGS. 8 through 10. In all applications shown in FIGS. 8 through 10, non-circular gears with identical pitch curves corresponding to FIG. 7 are used. By varying the angular position of the eccentric rod 18 or by angularly offsetting the non-circular gears 12, 14 on their shafts, the transfer function 69 of the non-circular gears 12, 14 develops as shown in FIG. 8 through 10.

FIG. 8 shows the combination of the non-circular pair of gears 12, 14 with the knuckle-joint press 70 of FIG. 7 (omitted). The angular position of the non-circular gears 12, 14 and of the eccentric rod 18 are selected in such manner that the press operates over a substantial time interval at exceedingly small ram speed. Because of the coincidence of the flat range 72 of the transfer function 69 of the non-circular gears 12, 14 of FIG. 7 (diagram 8-*a*) with the range of the transfer function 65 of the knuckle-joint press before the lower reversal point (diagram 8-*b*), the work stroke 67 is extremely flat (diagram 8-*c*). Such a motion is a significant advantage in forming such as cutting or stamping. In particular when cutting using susceptible tools, for instance fine cutting, such a work path of the press will be advantageous.

FIG. 9 again shows the combination of the non-circular pair of gears 12, 14 with the knuckle-joint press 70 corresponding to FIG. 7. The angular position of the non-circular gears 12, 14 or of the eccentric rod 18 has been so changed relative to the design of FIG. 8 that the speed of the press ram in the vicinity of the lower reversal point is minute over a long time interval. The flat range 72 of the transfer function 69 (diagram 9-*a*) cooperates with the range of the lower reversal point of the transfer function 65 (diagram 9*b*) of the knuckle joint.

Under certain conditions such a drive unit is appropriate for deep-draw press blankholders. Presently, when deep-drawing on mechanical presses, a hydraulic control system is frequently used for fine control of the blankholder pressure. The heretofore used complex knuckle-joint drive may then be eliminated in the case of a combination of non-circular gears in the system of drive-unit/knuckle-joint/hydraulic-control for the blankholder pressure, the work stroke of the knuckle-joint press corresponding to the function 67 for the work stroke of the knuckle joint press with non-circular knuckle-joint drive (diagram 9-*c*) allows eliminating a heretofore complex articulating drive.

FIG. 10 shows the ram path required for blankholders of deep-draw presses. The path is generated by combining the non-circular pair of gears 12, 14 of FIG. 7 with a knuckle-joint drive not elucidated further of which the transfer function is shown in diagram 10*b*. Arbitrary knuckle-joint drives may be used on presses with non-circular gears. The multiplicity of such possible combinations is not discussed further herein.

Accordingly, let there be a transfer function 71 of an illustrative knuckle-joint drive not further elucidated. The knuckle-joint drive evinces a short dwell point 71*a* at the lower reversal point (diagram 10-*b*). By combining the transfer function 69 of the non-circular gears 12, 14 of FIG. 7 with the transfer function 71 of the linkage drive not further discussed herein, the drive unit as a result evinces a marked dwell time 67 (diagram 10-*c*) and therefore is optimally appropriate to drive the blankholder of drawing press. It is feasibly thereby to employ substantially simpler knuckle-joint drives than the heretofore complex knuckle-joint drives used for blankholders of draw presses.

By combining non-circular gears with knuckle-joint drives it is now possible to meet the requirements of special, highly advanced forming methods using optimally matched ram paths and ram speeds.

What is claimed is:

1. A drive unit for a forming machine, comprising:
    a) a rotary drive and a knuckle-joint drive for operating a ram;
    b) a gear transmission operationally connecting said knuckle-joint drive to said rotary drive; and
    c) at least two mutually meshing noncircular gears in said gear transmission, said at least two mutually meshing noncircular gears having at least one of pitch curves and centers of rotation arbitrarily selectable and further having a periodically varying transmission ratio during movement of the ram from an upper dead point position to a lower dead point position that is at least segment-wise larger than that during movement of the ram from a lower dead point position to an upper dead point position.

2. Drive unit as claimed in claim 1, and wherein the ram motion during the forward stroke is different than the ram motion during the return stroke.

3. Drive unit as claimed in claims 1 and wherein the positioning in time of the ram lower dead point is offset relative to the center of the stroke interval.

4. Drive unit as claimed in claim 1 and further including an axially non-symmetric noncircular gear having a center of rotation on an axis of symmetry and being centrally mounted relative to its geometric center for operational engagement to a noncircular mating gear.

5. Drive unit as claimed in claim 1 and further including an axially asymmetric noncircular gear having an arbitrarily located center of rotation operationally associated with a noncircular mating gear.

6. Drive unit as claimed in claim 5, and wherein said axially non-symmetric noncircular gear is an eccentrically supported circular gear.

7. Drive unit as claimed in claim 1, and further including an axially non-symmetric noncircular gear having a center of rotation lying outside the axis of symmetry and operationally associated with a noncircular mating gear.

8. Drive unit as claimed in claim 1 and wherein the average transmission ratio of the gear transmission is an integral of one.

9. A drive unit for a forming machine, comprising:
   a) a rotary drive and a knuckle-joint drive for operating a ram;
   b) a gear transmission operationally connecting said knuckle-joint drive to said rotary drive; and
   c) at least two mutually meshing noncircular gears in said gear transmission, said at least two mutually meshing noncircular gears having at least one of pitch curves and centers of rotation arbitrarily selectable and further having a periodically varying transmission ratio during movement of the ram from an upper dead point position to a lower dead point position whereby the speed of the ram is segment-wise substantially constant within the work stroke range of the ram.

10. Drive unit as claimed in claim 9, and wherein the ram motion during the forward stroke is different than the ram motion during the return stroke.

11. Drive unit as claimed in claim 9, and wherein the positioning in time of the ram lower dead point is offset relative to the center of the stroke interval.

12. Drive unit as claimed in claim 9 and further including an axially non-symmetric noncircular gear having a center of rotation on an axis of symmetry and being centrally mounted relative to its geometric center for operational engagement to a noncircular mating gear.

13. Drive unit as claimed in claim 9 and further including an axially asymmetric noncircular gear having an arbitrarily located center of rotation operationally associated with a noncircular mating gear.

14. Drive unit as claimed in claim 9 and further including an axially non-symmetric noncircular gear having a center of rotation lying outside the axis of symmetry and operationally associated with a noncircular mating gear.

15. Drive unit as claimed in claim 9 and wherein the average transmission ratio of the gear transmission is an integral of one.

* * * * *